United States Patent [19]
Conway

[11] Patent Number: 5,435,099
[45] Date of Patent: Jul. 25, 1995

[54] MEMORIAL-STONE-ATTACHED CONTAINER

[76] Inventor: Eugene Conway, 46 Waldo Rd., Arlington, Mass. 02174

[21] Appl. No.: 23,913

[22] Filed: Feb. 26, 1993

[51] Int. Cl.$^6$ ............................................. A01G 9/02
[52] U.S. Cl. ......................................... 47/66; 248/313
[58] Field of Search ................. 47/66 C, 67; 248/313, 248/311.2, 316.7, 231.8, 27.8; 211/73, 88

[56] References Cited

U.S. PATENT DOCUMENTS

| | | | |
|---|---|---|---|
| 2,191,782 | 2/1940 | Valane | 248/311.2 |
| 2,547,744 | 4/1951 | Burger | 248/313 |
| 3,881,677 | 5/1975 | Ihlenfeld | 248/311.2 |
| 3,945,596 | 3/1976 | Marraccini | 248/311.2 |
| 5,178,354 | 1/1993 | Engvall | 248/316.7 |

FOREIGN PATENT DOCUMENTS

| | | | |
|---|---|---|---|
| 0026525 | 2/1979 | Japan | 47/66 C |
| 0104021 | 8/1979 | Japan | 47/66 C |

Primary Examiner—Ramon S. Britts
Assistant Examiner—Joanne C. Downs

[57] ABSTRACT

A new and improved container assembly apparatus for attachment to the front surface and rear surface of a memorial stone at a vertical edge of the memorial stone, for supporting an item (such as an arrangement of flowers) on the memorial stone. The apparatus includes a first clamping arm for placement against the front surface of the memorial stone, a second clamping arm for placement against the rear surface of the memorial stone, and a clamping arm support for supporting the first clamping arm and the second clamping arm in a horizontal orientation in spaced relation with each other. The clamping arm support is positioned in a vertical orientation adjacent a vertical edge of the memorial stone, such that the front surface and the rear surface of the memorial stone that are adjacent to the vertical edge of the memorial stone can be sandwiched between the first and second clamping arms. Connected to the clamping arm support, a clamping-pressure-exerting assembly is provided for forcing the first clamping arm against the front surface of the memorial stone. A container is connected to the clamping arm support for supporting the item (e.g. flower arrangement) adjacent to the vertical edge of the memorial stone. The clamping-pressure-exerting assembly may include a resilient material bend located between the first clamping arm and the clamping arm support. Alternately, the clamping-pressure-exerting assembly may include adjustable, threaded connector assemblies.

8 Claims, 4 Drawing Sheets

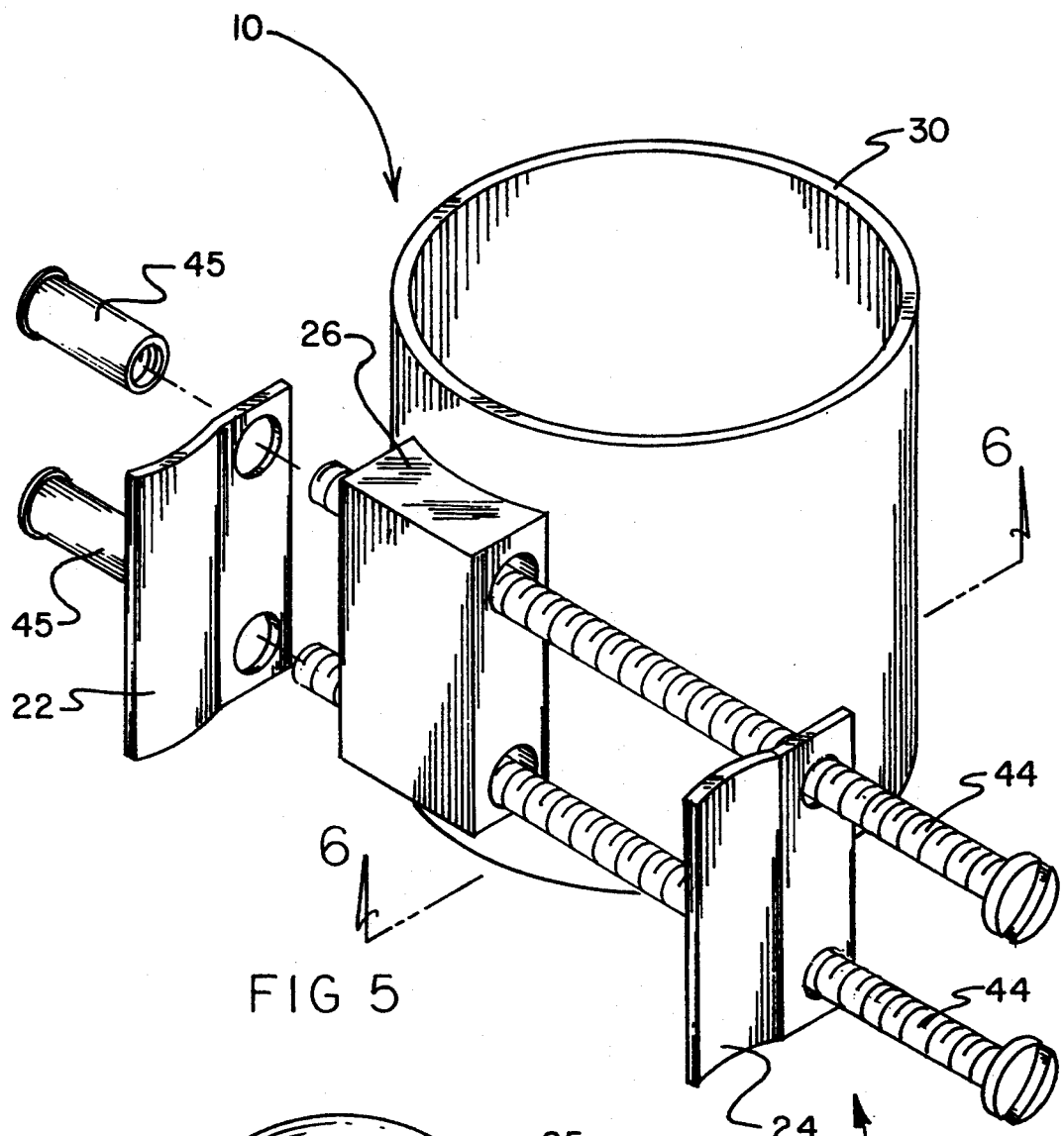
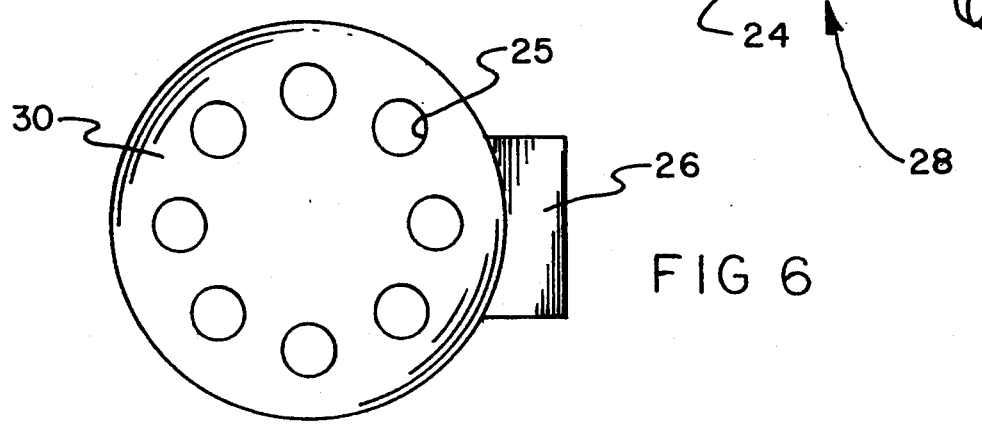

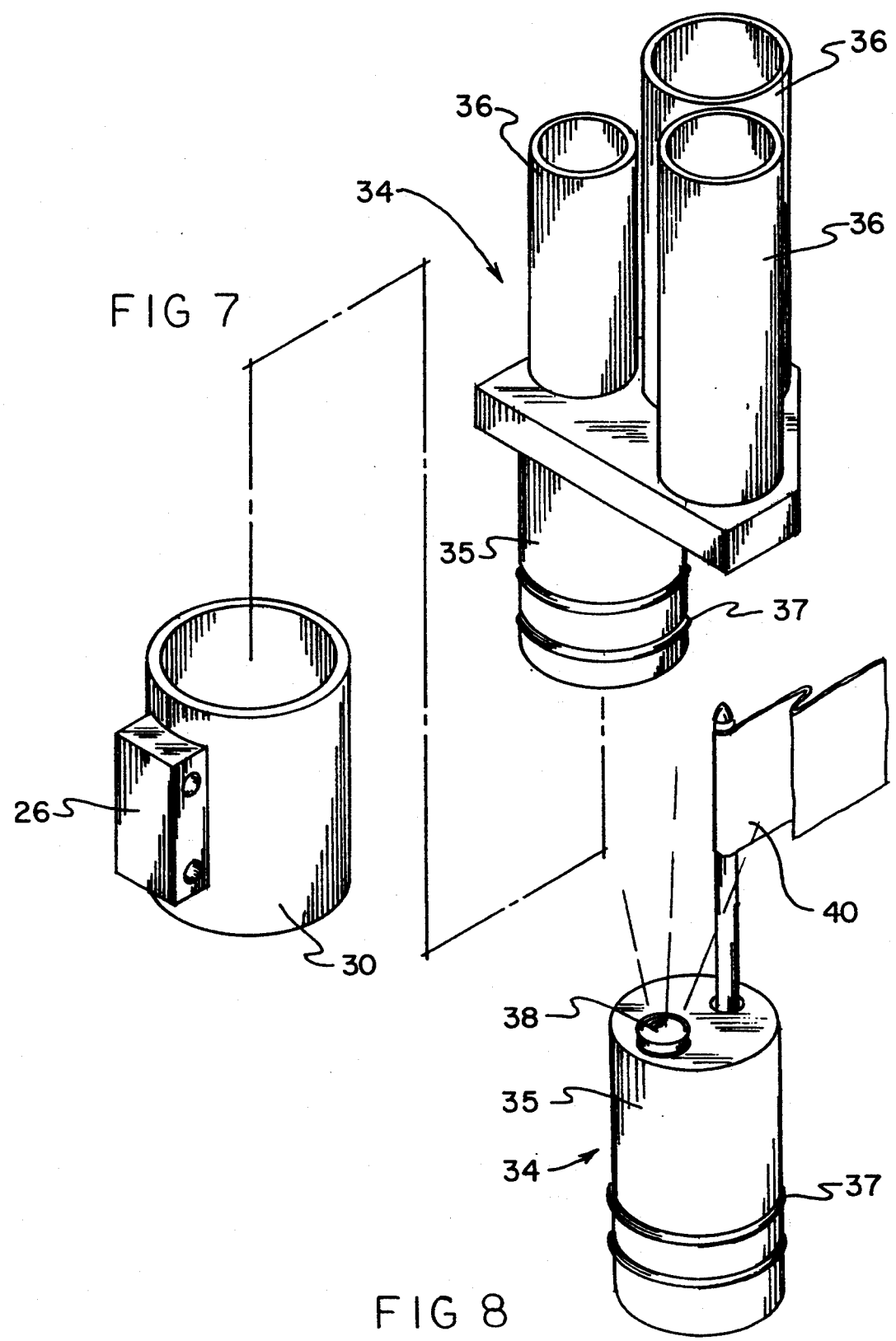

MEMORIAL-STONE-ATTACHED CONTAINER

BACKGROUND OF THE INVENTION

1. Field of the Invention

The present invention relates generally to displays for flowers, flags, and the like associated with a memorial stone, and more particularly, to a display especially adapted to be supported by the memorial stone.

2. Description of the Prior Art

Oftentimes, people leave flowers, flags, and other items on memorial stones on various occasions (i.e. Memorial Day, Mother's Day, Father's Day, etc.). Such items can easily be blown down or fall to the ground. Moreover, items that are initially placed on the ground next to the memorial stones are most often picked up and removed by cemetery personnel after a relatively short period of time, such as a week or two. This is unfortunate because oftentimes the items, such as flowers or plants, are still alive, and may even be still growing. In this respect, it would be desirable if a display for items associated with memorial stones were provided that would not be placed on the ground and be removed by cemetery personnel.

In one attempt to overcome these problems, display devices have been permanently attached to memorial stones. Such permanently attached display devices must be ordered when the stone is made and are relatively expensive. In this respect, it would be desirable if a display device associated with a memorial stone were inexpensive and capable of being retrofitted to virtually any existing, in-place memorial stone.

Often the item associated with the memorial stone is a flower pot in which a planted flower can grow for a long period of time. In this respect, it would be desirable if a flower pot associated with a memorial stone were inexpensive and capable of being retrofitted to virtually any existing, in-place memorial stone.

Other display devices, associated with memorial stones, are disclosed in the following U.S. patents: U.S. Pat. No. 3,511,461 of Clark; U.S. Pat. No. 4,217,729 of Cooper; U.S. Pat. No. 4,631,859 of Letter et al; U.S. Pat. No. 4,640,045 of Nesbitt et al; and U.S. Pat. No. 4,722,160 of Davis. More specifically, with the Letter el al and Davis devices, a flower receptacle is integrally and permanently formed with a gravestone.

The devices of Clark, Cooper, and Nesbitt et al are devices that need not be permanently attached to a memorial stone. More specifically, the Clark device employs a complex structure comprised of metal rods and suction cups for securing a flower pot adjacent to a side edge of the memorial stone. It appears that four, small surface area containing suction cups are employed to secure the complex structure to the front and rear surfaces of the memorial stone. Aside from the fact that the Clark device is a complex array of metal rods, attachment of the Clark device to the front and rear surfaces of the memorial stone appears to be quite tenuous. There are a number of reasons why suction cups may not retain their suction. Two primary reasons are that the surface to which they are attached is relatively rough and not conducive to an airtight seal between the surface and the suction cup; and that the surface to which they are attached is somewhat slippery, permitting an airtight seal to be broken. In this respect, it would be desirable if a memorial-stone-attached container assembly would be provided which avoided the problems associated with devices which include a complex metal rod structure and suction cups.

The flower cup disclosed in the Cooper patent requires its support to penetrate the ground. It would be desirable, however, if a memorial-stone-attached container assembly did not include an element that must be driven into the ground.

The flower saddle disclosed in the Nesbitt et al patent must be attached horizontally to the memorial stone at its top, horizontal edge. As such, the bottom horizontal surface of the saddle is supported by the top horizontal edge of the memorial stone. The saddle is clamped onto the memorial stone at its horizontal edge. The configuration of the Nesbitt et al device prevents the device from being employed at a side vertical edge of the memorial stone. If the clamps were clamped straddling a side edge instead of a top edge, then all of the contents of the container would be dumped out of the container. Moreover, by supporting the flower saddle at its bottom horizontal surface, the flower saddle has a high center of gravity with respect to its horizontal support surface. The result is that this flower container is relatively unstable in the face of forces caused by high winds and rains that are perpendicular to the front or rear surfaces of the saddle. This instability could result in the Nesbitt et al container tipping over in a high wind. In this respect, it would be desirable if a memorial-stone-attached container assembly were provided that is relatively stable in the face of forces caused by high winds and rains that are perpendicular to the front or rear surfaces of the container.

As of interest, the U.S. Pat. No. 3,809,345 of Tebbe et al discloses a device for decorating a grave, not a memorial stone.

Thus, while the foregoing body of prior art indicates it to be well known to use a complex, rod-containing and suction-cup-containing device for supporting flowers on a memorial stone, the provision of a more simple and cost effective device is not contemplated. Nor does the prior art described above teach or suggest a simple and inexpensive memorial-stone-attached container assembly that is capable of being retrofitted to virtually any existing, in-place memorial stone. The prior art does not provide a simple and inexpensive flower pot associated with a memorial stone that is capable of being retrofitted to virtually any existing, in-place memorial stone. In addition, the prior art does not provide a memorial-stone-attached container assembly which avoids the problems associated with complex metal rod containing devices and suction cups. Neither does the prior art provide a memorial-stone-attached container assembly that is relatively stable in the face of forces caused by high winds and rains that are perpendicular to the front or rear surfaces of the container assembly.

The foregoing disadvantages are overcome by the unique memorial-stone-attached container assembly apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved container assembly apparatus for attachment to the front and rear surfaces a memorial stone at a vertical edge of the memorial stone, for supporting an item (such as an arrangement of flowers) on the memorial stone. The memorial-stone-attached container assembly apparatus includes a first clamping arm for placement against the front surface of the memorial stone, a second clamping arm for placement against the rear surface of the memorial stone, and a clamping arm support for supporting the first clamping arm and the second clamping arm in a horizontal orientation in spaced relation with each other.

The clamping arm support is positioned in a vertical orientation adjacent a vertical edge of the memorial stone, such that the front surface and the rear surface of the memorial stone adjacent to the vertical edge of the memorial stone can be sandwiched between the first and second clamping arms. Connected to the clamping arm support, a clamping-pressure-exerting assembly is provided for forcing the first clamping arm against the front surface of the memorial stone. A container is connected to the clamping arm support for supporting the item (e.g. flower arrangement) adjacent to the vertical edge of the memorial stone.

The clamping-pressure-exerting assembly may include a resilient material bend located between the first clamping arm and the clamping arm support. The first clamping arm, the second clamping arm, the clamping arm support, the clamping-pressure-exerting assembly, and the container may be made from a unified, integral structure. Alternately, the clamping-pressure-exerting assembly may include adjustable, threaded connector assemblies.

The first clamping arm and the second clamping arm may include resilient, flexible, friction-creating layers for gripping the front and rear surfaces of the memorial stone.

The container may support a removable and replaceable support module. The module may include a plurality of flower holders. Alternately, the module may include a flashlight and a flag. Other removable and replaceable modules may also be employed.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least four preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved memorial-stone-attached container assembly apparatus which has all of the advantages of the prior art and none of the disadvantages.

It is another object of the present invention to provide a new and improved memorial-stone-attached container assembly apparatus which may be easily and efficiently manufactured and marketed.

It is a further object of the present invention to provide a new and improved memorial-stone-attached container assembly apparatus which is of durable and reliable construction.

An even further object of the present invention is to provide a new and improved memorial-stone-attached container assembly apparatus which is susceptible of a low cost of manufacture with regard to both materials and labor, and which accordingly is then susceptible of low prices of sale to the consuming public, thereby making such memorial-stone-attached container assembly apparatus available to the buying public.

Still yet a further object of the present invention is to provide a new and improved memorial-stone-attached container assembly apparatus that is inexpensive and capable of being retrofitted to virtually any existing, in-place memorial stone.

Still another object of the present invention is to provide a new and improved memorial-stone-attached container assembly apparatus for items associated with memorial stones that is not placed on the ground and would not be readily removed by cemetery personnel.

Yet another object of the present invention is to provide a new and improved memorial-stone-attached container assembly apparatus that provides a flower pot which is associated with a memorial stone that is inexpensive and capable of being retrofitted to virtually any existing, in-place memorial stone.

Even another object of the present invention is to provide a new and improved memorial-stone-attached container assembly apparatus which is simple and inexpensive and avoids the problems associated with complex metal rod containing devices and suction cups.

Still a further object of the present invention is to provide a new and improved memorial-stone-attached container assembly apparatus that does not include an element that must be driven into the ground.

Yet another object of the present invention is to provide a new and improved memorial-stone-attached container assembly apparatus that is relatively stable in the face of forces caused by high winds and rains that are perpendicular to the front or rear surfaces of the memorial stone.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is an exploded perspective view of a circular third embodiment of the memorial-stone-attached container assembly apparatus of the invention.

FIG. 6 is a bottom view of the embodiment of the invention shown in FIG. 5 taken along the line 6—6 thereof without showing the screws, nuts, and clamping arms.

FIG. 7 is an exploded perspective view of a circular fourth embodiment of the memorial-stone-attached container assembly apparatus of the invention which includes a removable and replaceable display module for displaying flowers.

FIG. 8 is a perspective view of an additional removable and replaceable display module that can be used with the fourth embodiment of the invention shown in FIG. 7.

DESCRIPTION OF THE PREFERRED EMBODIMENT

With reference to the drawings, a new and improved memorial-stone-attached container assembly apparatus 10 embodying the principles and concepts of the present invention will be described.

Figure 1:
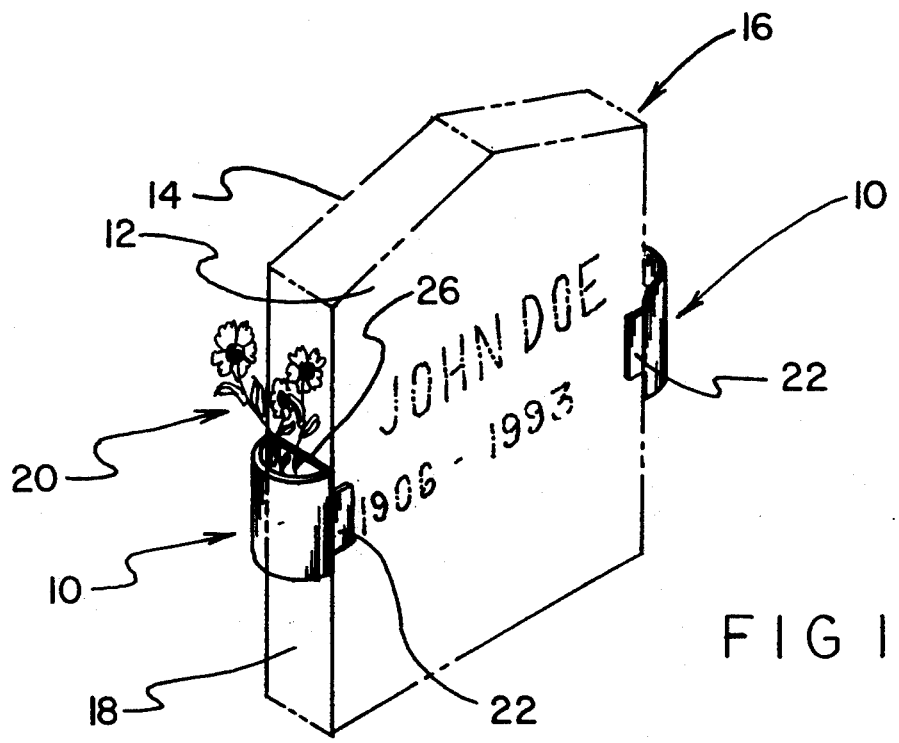
FIG. 1 is a perspective view showing a pair of semicircular first preferred embodiments of the memorial-stone-attached container assembly apparatus of the invention attached to a memorial stone.
Figure 2:
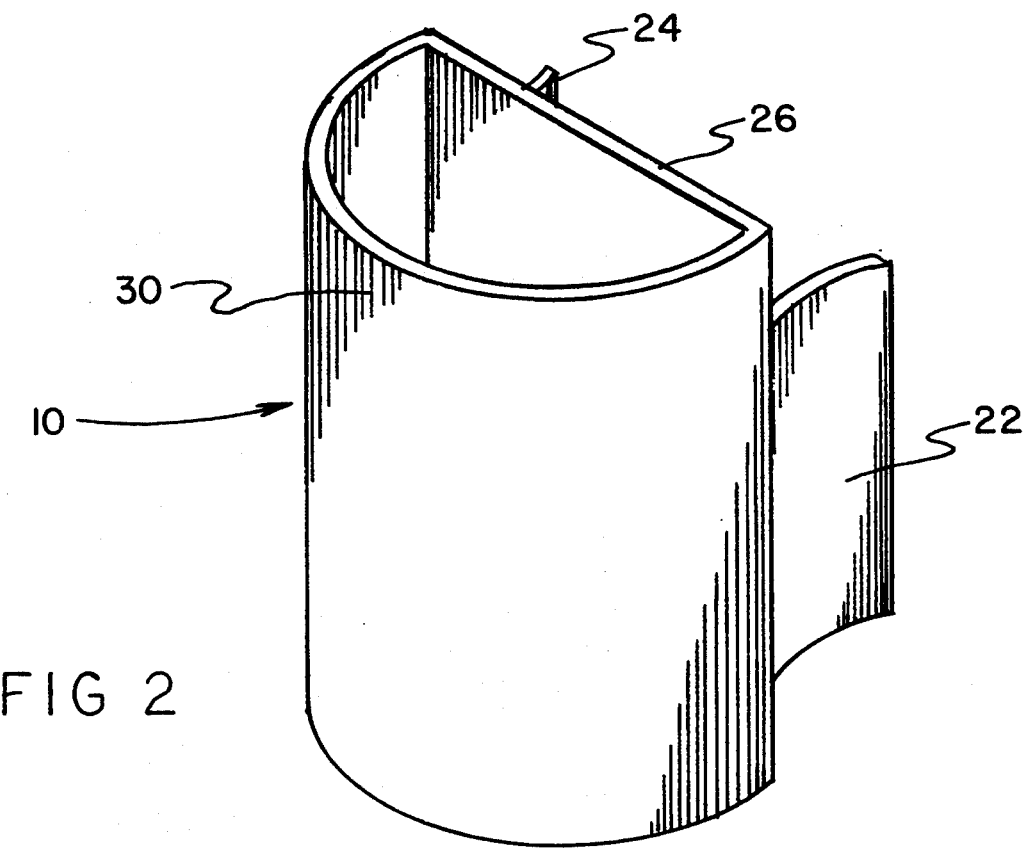
FIG. 2 is an enlarged perspective view of one of the pair of memorial-stone-attached container assembly apparatuses of the invention shown in FIG. 1.

Turning initially to FIGS. 1-2, there is shown a first exemplary embodiment of the memorial-stone-attached container assembly apparatus of the invention generally designated by reference numeral 10. The memorial-stone-attached container assembly apparatus 10 of the invention is for attachment to a front surface 12 and rear surface 14 of a memorial stone 16 at a vertical edge 18 of the memorial stone 16, for supporting an item 20 (a flower arrangement 20) on the memorial stone 16.

In its preferred form, memorial-stone-attached container assembly apparatus 10 includes a first clamping arm 22 for placement against the front surface 12 of the memorial stone 16, a second clamping arm 24 for placement against the rear surface 14 of the memorial stone 16, and a clamping arm support 26 for supporting the first clamping arm 22 in a horizontal orientation and the second clamping arm 24 in a horizontal orientation in spaced relation with each other. The clamping arm support 26 is positioned in a vertical orientation adjacent a vertical edge 18 of the memorial stone 16, such that the front surface 12 and the rear surface 14 of the memorial stone 16 which are adjacent to the vertical edge 18 of the memorial stone 16 can be sandwiched between the first clamping arm 22 and the second clamping arm 24.

Figure 3:
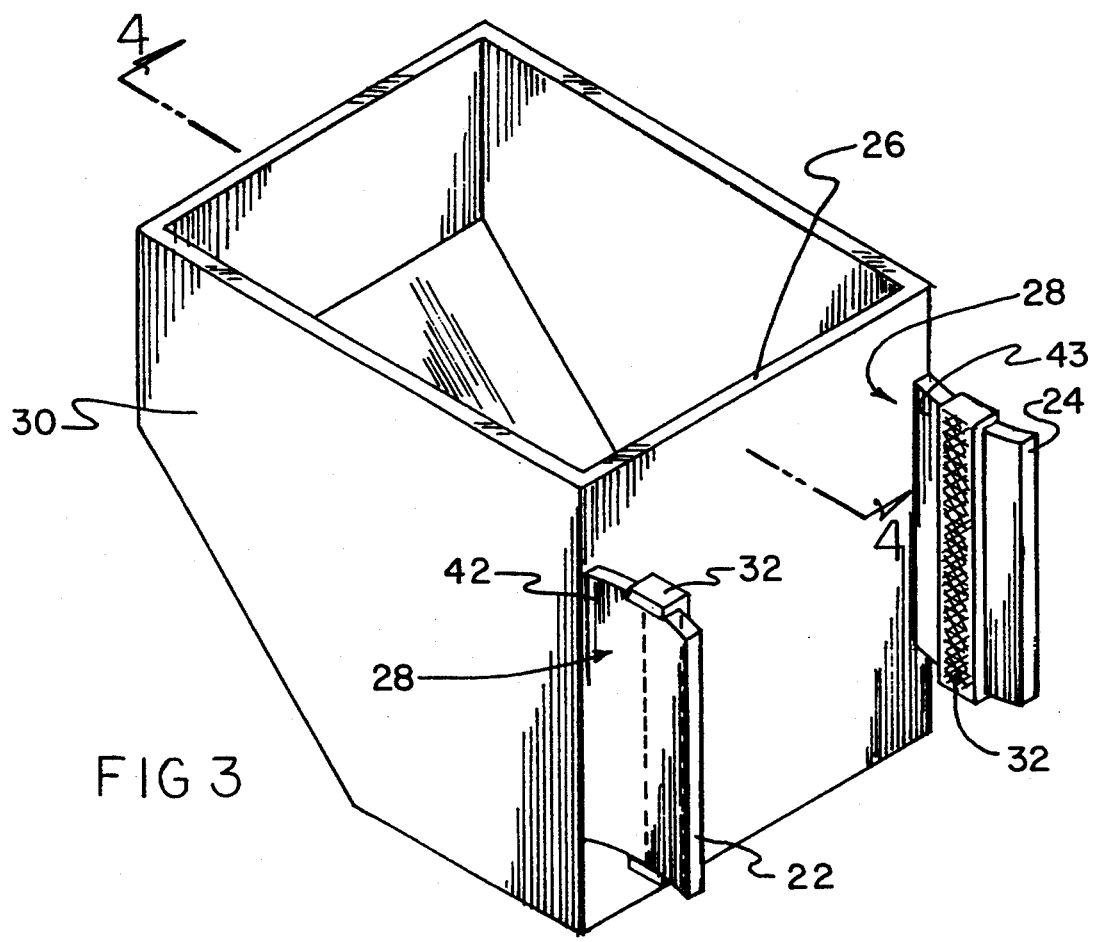
FIG. 3 is a perspective view of a rectangular second preferred embodiment of the memorial-stone-attached container assembly apparatus of the invention.
Figure 4:
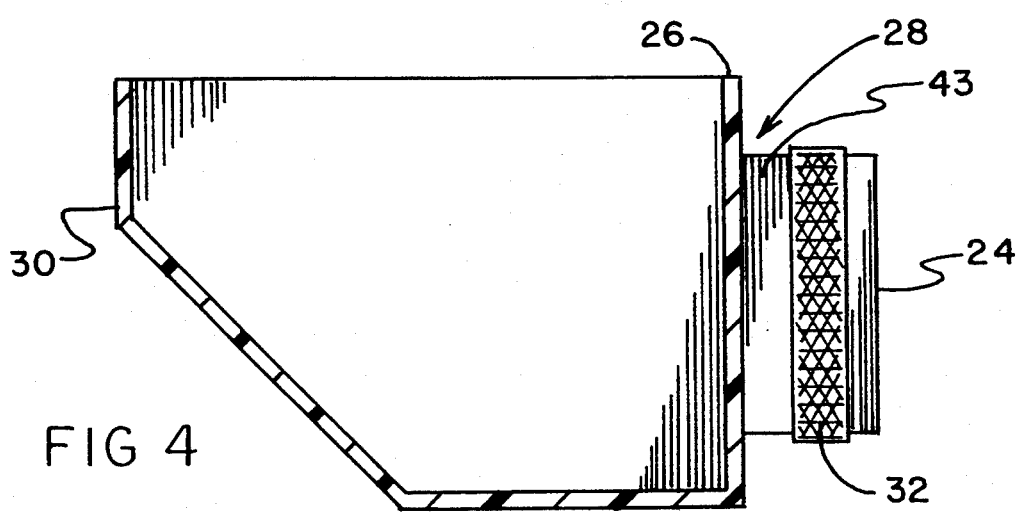
FIG. 4 is a cross-sectional view of the embodiment of the memorial-stone-attached container assembly apparatus of the invention shown in FIG. 3, taken along the line 4—4 thereof.

Turning to FIGS. 3-4, a second embodiment of the memorial-stone-attached container assembly apparatus 10 of the invention is shown. Reference numerals are shown that correspond to like reference numerals that designate like elements shown in the other figures. In addition, in the rectangular embodiment of the invention shown in FIGS. 3-4, (as in the embodiment shown in FIGS. 12), a clamping-pressure-exerting assembly 28 includes a resilient material bend 42 located between the first clamping arm 22 and the clamping arm support 26. An additional resilient material bend 43 is located between the second clamping arm 24 and the clamping arm support 26. More specifically, bends 42 and 43 are resilient because of an inherent spring modulus of elasticity of the first and second clamping arms when they are spread apart somewhat with respect to the clamping arm support 26 in order to sandwich the memorial stone 16 between the clamping arms.

As shown in FIGS. 3-4, the first clamping arm 22 and second clamping arm 24 include a resilient, flexible, friction-creating rubber strip 32 for gripping the front surface 12 and the rear surface 14 of the memorial stone 16, respectively.

As shown in FIGS. 1-4, the first clamping arm 22, the second clamping arm 24, the clamping arm support 26, the clamping-pressure-exerting assembly 28, and the container 30 are made from a unified, integral structure.

Turning to FIGS. 5-6, a third embodiment of the memorial-stone-attached container assembly apparatus 10 of the invention is shown. Reference numerals are shown that correspond to like reference numerals that designate like elements shown in the other figures. In addition, the clamping-pressure-exerting assembly 28 includes long adjustable, threaded screws 44 and complementarily threaded open-ended nuts 45. As shown, the threaded screws 44 pass through respective apertures in a second clamping arm 24, a clamping arm support 26, and a first clamping arm 22 before they are screwed into the complementary open-ended nuts 45. In this embodiment, a container 30 and the clamping arm support 26 are a unified, integrated structure. Although not shown, it is understood that the memorial stone 16 is sandwiched between the first clamping arm 22 and the second clamping arm 24. With this embodiment of the invention, the first clamping arm 22 and the second clamping arm 24 can be adjusted to accommodate a wide variety of sizes of memorial stones 16. The bottom view in FIG. 6 shows a plurality of drain holes 25 that are employed when the container 30 is used as a flower pot or as a pot for another potted plant.

Turning to FIGS. 7-8, a fourth embodiment of the invention is shown. Reference numerals are shown that correspond to like reference numerals that designate like elements shown in the other figures. In addition, the container 30 supports a removable and replaceable support module 34. In FIG. 7, the module 34 comprises a plurality of flower holders 36. In FIG. 8, the removable and replaceable support module 34 includes a flashlight 38 and a flag 40. The module 34 fits like a piston in a cylinder. That is, the module 34 has a piston-like base portion 35 that fits into the cylinder-like container 30. The base portion 35 is provided with a number of O-rings 37 that provide a secure friction fit between the module 34 and the container 30.

The container can be made from a wide variety of inexpensive materials which include wood, metal (such as aluminum), and plastic. The container material is chosen with environmental factors in mind such as freezing, thawing, precipitation, and sunlight.

For purposes of explanation, the first clamping arm has been described as contacting the front surface of the memorial stone; and the second clamping arm has been described as contacting the rear surface of the memorial stone. It is understood that the first and second clamping arms are interchangeable, and the second clamping arm can contact the front surface and the first clamping arm can contact the rear surface.

The resilient, flexible, friction-creating means 32 that is used for gripping the front surface 12 and the rear surface 14 of the memorial stone 16 can be made from a wide variety of well known materials such as different kinds of rubbers and plastics. A Teflon TM coating would be resistant to environmental degradation caused by heat, cold, and sunlight.

The clamping-pressure-exerting assembly 28 can assume a variety of alternate structures. For example, the clamping arms can be connected by hinges to the clamping arm support 26, and springs can be used to urge the clamping arms towards each other. When the memorial-stone-attached container assembly apparatus is placed on the memorial stone 16, the springs provide the clamping pressure on the memorial stone 16 sandwiched between the clamping arms.

With the invention, the center of gravity of the container in the memorial-stone-attached container assembly apparatus of the invention is located below the top edge of the memorial stone. As a result, if a strong perpendicular wind is received by one side of the container, the container will not be tipped over by the wind.

It is apparent from the above that the present invention accomplishes all of the objects set forth by providing a new and improved memorial-stone-attached container assembly apparatus that is low in cost, relatively simple in design and operation, and which may advantageously be used to retrofit virtually any existing, in-place memorial stone with a memorial-stone-attached container assembly.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved container assembly apparatus for attachment to a substantially flat front surface and substantially flat rear surface of a memorial stone at a vertical edge of the memorial stone, for supporting an item on the memorial stone, said apparatus comprising:

a first clamping arm which includes a clamping surface mid-way along said first clamping arm adapted for placement against the substantially flat front surface of the memorial stone, a second clamping arm which includes a clamping surface mid-way along said second clamping arm adapted for placement against the substantially flat rear surface of the memorial stone, clamping arm support means for supporting said first clamping arm in a horizontal orientation and said second clamping arm in a horizontal orientation in spaced relation with each other, said clamping arm support means being positioned in a vertical orientation adjacent a vertical edge of the memorial stone, such that the substantially flat front surface and the substantially flat rear surface of the memorial stone adjacent to the vertical edge of the memorial stone can be sandwiched between said clamping surface of said first clamping arm and said clamping surface of said second clamping arm, clamping pressure exerting means, connected to said clamping arm support means, for forcing said clamping surface of said first clamping arm against the substantially flat front surface of the memorial stone, and container means, connected to said clamping arm support means, for supporting the item adjacent to the vertical edge of the memorial stone.

2. The apparatus described in claim 1 wherein said clamping pressure exerting means includes a resilient material bend located between said first clamping arm and said clamping arm support means.

3. The apparatus described in claim 1 wherein said first clamping arm, said second clamping arm, said clamping arm support means, said clamping pressure exerting means, and said container means are made from a unified, integral structure.

4. The apparatus described in claim 1 wherein said clamping pressure exerting means includes adjustable, threaded connector assemblies.

5. The apparatus described in claim 1 wherein said first clamping arm and second clamping arm include resilient, flexible, friction-creating means for gripping the front surface and the rear surface of the memorial stone.

6. A container assembly and memorial stone apparatus, comprising:

a memorial stone which includes a substantially flat front surface, a substantially flat rear surface, and a vertical edge, a first clamping arm which includes a clamping surface mid-way along said first clamping arm adapted for placement against said substantially flat front surface of said memorial stone, a second clamping arm which includes a clamping surface mid-way along said second clamping arm adapted for placement against said substantially flat rear surface of said memorial stone, clamping arm support means for supporting said first clamping arm in a horizontal orientation and said second clamping arm in a horizontal orientation in spaced relation with each other, said clamping arm support means being positioned in a vertical orientation adjacent said vertical edge of said memorial stone, such that said substantially flat front surface and said substantially flat rear surface of said memorial stone adjacent to said vertical edge of said memorial stone can be sandwiched between said clamping surface of said first clamping arm and said clamping surface of said second clamping arm, clamping pressure exerting means, connected to said clamping arm support means, for forcing said clamping surface of said first clamping arm against said substantially flat front surface of said memorial stone, and container means, connected to said clamping arm support means, for supporting an item adjacent to said vertical edge of said memorial stone.

7. The apparatus described in claim 6 wherein said clamping pressure exerting means includes a resilient material bend located between said first clamping arm and said clamping arm support means.

8. The apparatus described in claim 6 wherein said first clamping arm, said second clamping arm, said clamping arm support means, said clamping pressure exerting means, and said container means are made from a unified, integral structure.

* * * * *